(12) United States Patent
Zhao

(10) Patent No.: US 11,860,497 B2
(45) Date of Patent: Jan. 2, 2024

(54) PIXEL UNIT, ARRAY SUBSTRATE, AND DISPLAY PANEL

(71) Applicant: TCL CHINA STAR OPTOELECTRONICS TECHNOLOGY CO., LTD., Shenzhen (CN)

(72) Inventor: Ling Zhao, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 696 days.

(21) Appl. No.: 17/047,665

(22) PCT Filed: Jun. 3, 2020

(86) PCT No.: PCT/CN2020/094116
§ 371 (c)(1),
(2) Date: Oct. 14, 2020

(87) PCT Pub. No.: WO2021/203543
PCT Pub. Date: Oct. 14, 2021

(65) Prior Publication Data
US 2023/0152646 A1    May 18, 2023

(30) Foreign Application Priority Data
Apr. 8, 2020 (CN) .......................... 202010269014.9

(51) Int. Cl.
*G02F 1/1362* (2006.01)
*G09G 3/36* (2006.01)

(52) U.S. Cl.
CPC ....... *G02F 1/13629* (2021.01); *G09G 3/3655* (2013.01); *G09G 2300/0426* (2013.01)

(58) Field of Classification Search
CPC .......... G02F 1/13629; G02F 1/134309; G02F 1/136213; G02F 1/13624; G02F 1/136286;
(Continued)

(56) References Cited

U.S. PATENT DOCUMENTS

| | | | |
|---|---|---|---|
| 2002/0159015 A1 | 10/2002 | Seo et al. | |
| 2005/0051860 A1* | 3/2005 | Takeuchi | H01L 27/14843 257/E27.152 |

(Continued)

FOREIGN PATENT DOCUMENTS

| | | |
|---|---|---|
| CN | 103091912 A | 5/2013 |
| CN | 104050885 A | 9/2014 |

(Continued)

OTHER PUBLICATIONS

International Search Report in International application No. PCT/CN2020/094116, dated Jan. 8, 2021.
(Continued)

*Primary Examiner* — Sitaramarao S Yechuri
(74) *Attorney, Agent, or Firm* — PV IP PC; Wei Te Chung; Zhigang Ma

(57) ABSTRACT

The present disclosure provides a pixel unit, wherein common signal lines connected to shared thin film transistors located in lens areas are constructed as first common signal lines, and common signal lines connected to shared thin film transistors located in lens splicing areas are constructed as second common signal lines. The pixel unit provided by the present disclosure can independently adjust partial voltages of the shared thin film transistors in the lens areas and the lens splicing areas, thereby relieving deterioration of Lens-Mura occurring in the lens splicing areas.

19 Claims, 2 Drawing Sheets

(58) Field of Classification Search
CPC .... G02F 1/1362; G02F 1/1335; G02F 1/1343; G09G 3/3655; G09G 2300/0426
See application file for complete search history.

(56) References Cited

U.S. PATENT DOCUMENTS

2013/0235316 A1    9/2013  Hsiao et al.
2015/0002497 A1*  1/2015  Dong .................. G09G 3/3655
                                                           345/87

FOREIGN PATENT DOCUMENTS

| CN | 105807520 A | 7/2016 | |
|---|---|---|---|
| CN | 107065350 A | 8/2017 | |
| CN | 107991818 A | 5/2018 | |
| DE | 102011055927 A1 * | 6/2012 | ............. G02B 27/26 |
| TW | 201131308 A | 9/2011 | |

OTHER PUBLICATIONS

Written Opinion of the International Searching Authority in International application No. PCT/CN2020/094116, dated Jan. 8, 2021.
Chinese Office Action issued in corresponding Chinese Patent Application No. 202010269014.9 dated Nov. 4, 2020, pp. 1-5.

* cited by examiner

PIXEL UNIT, ARRAY SUBSTRATE, AND DISPLAY PANEL

This application is a Notional Phase of PCT Patent Application No. PCT/CN2020/094116 having international filing date of Jun. 3, 2020, which claims priority to Chinese Patent Application with the application No. 202010269014.9 filed on Apr. 8, 2020 with the National Intellectual Property Administration, the disclosure of which is incorporated by reference in the present application in its entirety.

FIELD OF INVENTION

The present disclosure relates to a display technology field, particularly to a pixel unit technology field, specifically to a pixel unit, an array substrate, and a display panel.

BACKGROUND OF INVENTION

As market requires liquid crystal displays with wider and wider viewing angles, developers have developed 8-domain designs. In order to ensure penetration rates of panels, they have successively developed three transistors and more than three transistors (3T&3T+) pixel structure designs. However, a side effect of the 3T&3T+ is worsened display at junctions of an exposure area, as the area will generate band-shaped, uneven spots (Lens-Mura).

An exposure process is required during a formation of thin film transistors. However, exposure will be performed in sections, due to a limitation of sizes of exposure machines. For example, a G8.5 NIKON exposure machine is spliced and connected by 11 lens. Based on this, light fluxes at junctions and non-junctions are different, which lead to regular difference in critical dimension (CD) after lithography and coincidence accuracy (referred to as OL) between patterns during lithography of shared thin film transistors in the 3T&3T+, which in turn lead to an occurrence of Lens-Mura related to lens match.

The 3T&3T+ introduces a third thin film transistor (TFT), a sub-thin film transistor (sub-TFT) connects to a transparent common electrode line (C_ITO) in the 3T structure or a share bar (shared metal wire) in the 3T+ structure through the 3rd-TFT (shared thin film transistor), and a brightness of a sub-pixel is adjusted by controlling a signal of the C_ITO/share bar, so as to improve panel viewing angles. The 3rd-TFT is different from the main thin film transistor (main-TFT) & sub-TFT in position and orientations, and thus it cannot be adjusted equivalently by adjusting lens. For example, when DCD of channel length (CL) of the main-TFT/sub-TFT is 0, DCD of CL of the 3rd-TFT is 0.2 um, wherein DCD is the CD difference between the lens area and the lens junction area. The existence of DCD leads to different partial voltages of 3rd-TFTs in the lens area and the lens junction area, and the occurrence of Lens-Mura.

However, in traditional technical solutions, both the 3rd-TFT in the lens area and the 3rd-TFT in the lens junction area are connected to the same C_ITO/share bar signal, resulting in independent adjustment of the 3rd-TFT in the lens area or the 3rd-TFT in the lens junction area, and thus leads to the deterioration of the Lens-Mura.

SUMMARY OF INVENTION

The present disclosure provides a pixel unit, which solves the deterioration problem of Lens-Mura caused by different partial voltages of the shared thin film transistors in the lens areas and the lens junction areas.

In the first aspect, the present disclosure provides a pixel unit, wherein the pixel unit includes main pixel areas and sub-pixel areas, and the sub-pixel areas are provided with shared thin film transistors to pull down the voltages of sub-pixel electrodes; gates of the shared thin film transistors are connected to scan lines corresponding to the pixel unit, sources of the shared thin film transistors are connected to the sub-pixel electrodes, and drains of the shared thin film transistors are connected to common signal lines; the shared thin film transistors have lens areas and lens splicing areas alternately formed corresponding to an exposure equipment during the manufacturing process, wherein the common signal lines connected to the shared thin film transistors located in the lens areas are configured as first common signal lines for receiving first common voltage signals, and common signal lines connected to the shared thin film transistors located in the lens splicing areas are configured as second common signal lines for receiving second common voltage signals.

On the basis of the first aspect, in the first embodiment of the first aspect, the main pixel areas are provided with main thin film transistors, and the sub-pixel areas are provided with sub-thin film transistors; data lines corresponding to the pixel unit are connected with drains of the main thin film transistors and the sub-thin film transistors; the scan lines are connected to gates of the main thin film transistors, gates of the sub-thin film transistors, and the gates of the shared thin film transistors; sources of the main thin film transistors are connected to main pixel electrodes arranged in the main pixel areas; and sources of the sub-thin film transistors are connected to the sub-pixel electrodes and the sources of the shared thin film transistors.

On the basis of the first aspect, in the second embodiment of the first aspect, the first common signal lines and the second common signal lines are both transparent metal wires and are located in different film layers.

On the basis of the first aspect, in the third embodiment of the first aspect, voltages of the first common voltage signals are different from voltages of the second common voltage signals.

On the basis of the first aspect, in the fourth embodiment of the first aspect, each second common signal line is connected to the drains of the shared thin film transistors in a corresponding column, and the shared thin film transistors in the corresponding column are located in the lens splicing areas.

On the basis of the first aspect, in the fifth embodiment of the first aspect, each first common signal line is connected to the drains of the shared thin film transistors in a corresponding column, and the shared thin film transistors in the corresponding column are located in the lens areas.

In the second aspect, the present disclosure provides an array substrate, which comprises a plurality of pixel units according to any one of the above embodiments, and the plurality of pixel units are distributed in array arrangement on the array substrate.

In the third aspect, the present disclosure provides a display panel, which comprises the pixel unit and the color filter substrate of the first embodiment of the first aspect, and a liquid crystal layer between the pixel unit and the color filter substrate.

On the basis of the third aspect, in the first embodiment of the third aspect, a transparent electrode layer is formed on the color filter substrate; a main storage capacitor is formed between the main pixel electrode and the transparent electrode layer; and a sub-storage capacitor is formed between the sub-pixel electrode and the transparent electrode layer.

On the basis of the first embodiment of the third aspect, in the second embodiment of the third aspect, the main storage capacitor and the sub-storage capacitor have the same capacitance.

In the pixel unit provided in the present disclosure, the shared thin film transistors located in the lens area and the lens splicing area are respectively connected to the first common signal line and the second common signal line, and respectively receive the first common voltage signal and the second common voltage signal. The partial voltages of the shared thin film transistors in the lens area and the lens splicing area can be independently adjusted, and thus the Lens-Mura deterioration in the lens splicing area can be relieved. The array substrate provided in the present disclosure includes the pixel units and can also relieve the Lens-Mura occurring in the lens splicing area. The display panel provided by the present disclosures includes the pixel units and can also relieve the Lens-Mura occurring in the lens splicing area.

DETAILED DESCRIPTION OF PREFERRED EMBODIMENTS

In order to make the purposes, technical solutions and effects of the present disclosure more clear, the present disclosure will be described in further detail with reference to the accompanying drawings and embodiments. It should be understood that the specific embodiments described herein are only used to explain the present disclosure, and are not used to limit.

Figure 1:
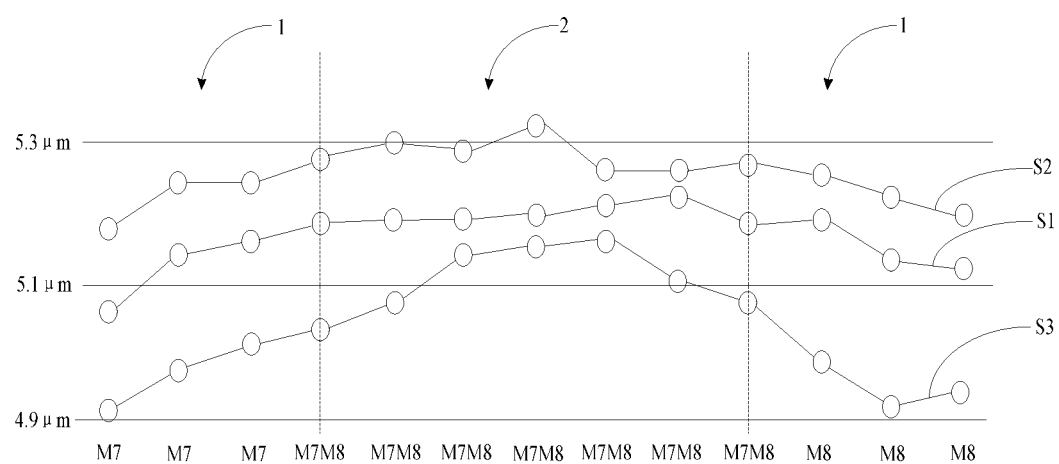
FIG. 1 is a schematic diagram of curves of channel length differences of thin film transistors in a pixel unit disclosed in the embodiments of the present disclosure.

In order to better understand the present disclosure, channel length differences between main thin film transistors, sub-thin film transistors, and shared thin film transistors in lens areas 1 and a lens splicing area 2 are described with reference to FIG. 1, wherein M7 and M8 represent the lens area 1, and M7M8 represents the lens splicing area 2. The channel length change curve S1 of the main thin film transistors and the channel length change curve S2 of the sub-thin film transistors are smooth, however, the channel length change curve S3 of the shared thin film transistors appears to have a steep rise and fall in the lens splicing area 2, and the difference in channel length exceeds 0.2 μm, which results in significant inconsistency in the partial voltages of the shared thin film transistors in the lens areas 1 and the lens splicing area 2, thereby leading to deterioration of the Lens-Mura of the lens splicing area 2.

Figure 2:
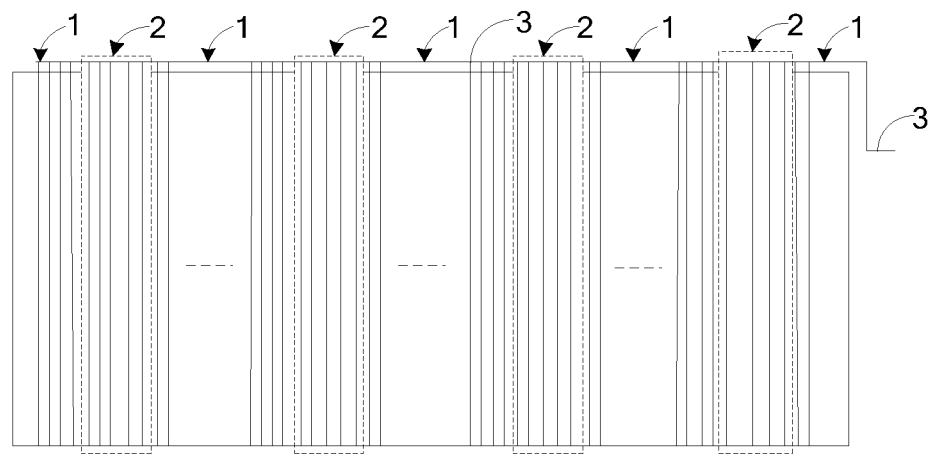
FIG. 2 is a schematic structural diagram of common signal lines in conventional technical solutions.

As shown in FIG. 2, in the traditional technical solutions, common signal lines 3 connected to the shared thin film transistors of the lens areas 1 and the lens splicing areas 2 are connected together, and thus the partial voltages of the shared thin film transistors in the lens splicing areas 2 cannot be adjusted and improved, therefore the Lens-Mura of the lens splicing areas 2 exists till now.

Based on the above circumstances, in the present disclosure, the shared thin film transistors located in the lens areas 1 and the lens splicing areas 2 are connected to first common signal lines 31 and second common signal lines 32 respectively, and receive first common voltage signals and second common voltage signals respectively. The partial voltages of the shared thin film transistors in the lens areas 1 and the lens splicing areas 2 can be independently adjusted, thereby reducing the deterioration of the Lens-Mura in the lens splicing areas 2.

Figure 3:
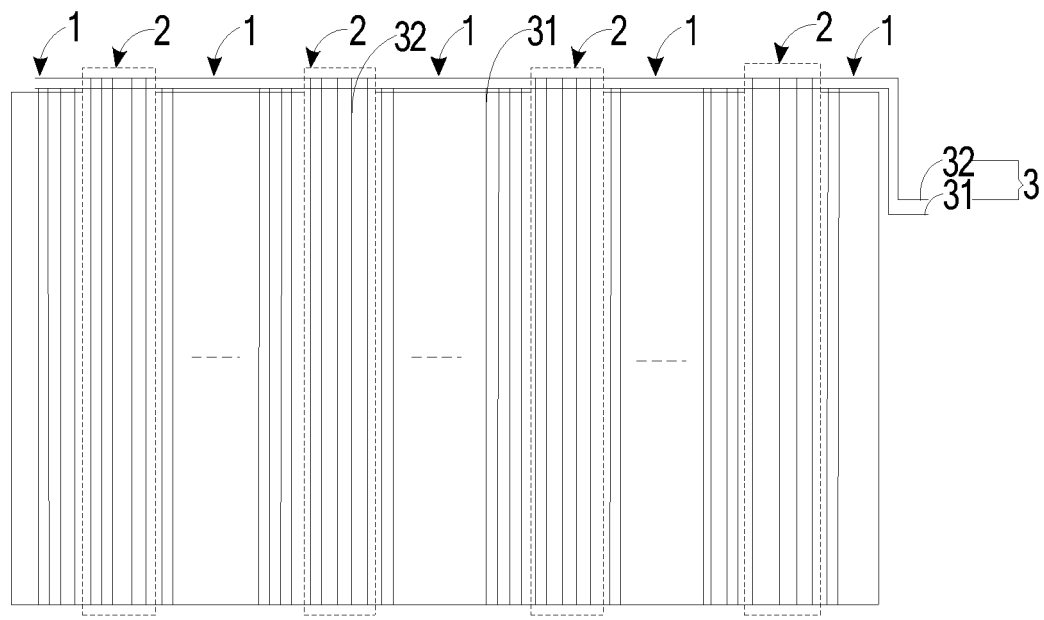
FIG. 3 is a schematic structural diagram of a pixel unit disclosed in the embodiments of the present disclosure.
Figure 4:
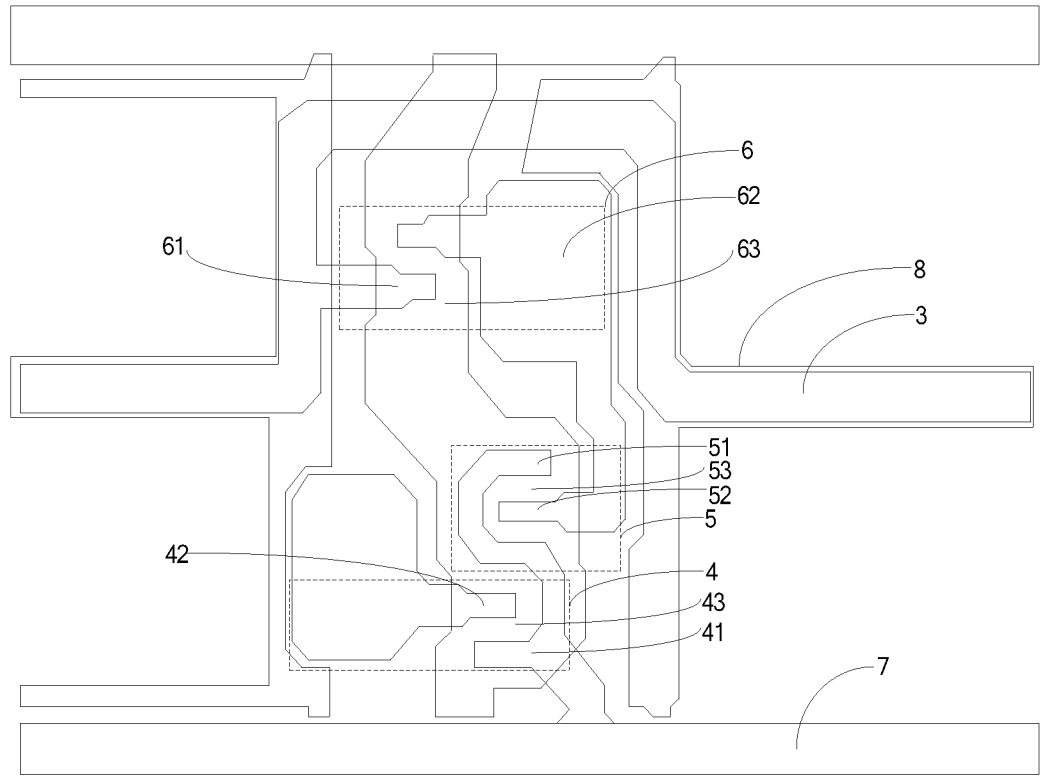
FIG. 4 is a schematic structural diagram of a first common signal line and a second common signal line disclosed in the embodiments of the present disclosure.

As shown in FIGS. 3 and 4, the present embodiment provides a pixel unit. The pixel unit includes main pixel areas and sub-pixel areas. The sub-pixel areas are provided with shared thin film transistors 6 to pull down the voltages of sub-pixel electrodes. Gates 63 of the shared thin film transistors 6 are connected to scan lines 8 corresponding to the pixel unit, sources 62 of the shared thin film transistors 6 are connected to the sub-pixel electrodes, and drains 61 of the shared thin film transistors 6 are connected to common signal lines 3. The shared thin film transistors 6 include the lens areas 1 and the lens splicing areas 2 alternately connected corresponding to an exposure equipment used in the manufacturing process. The common signal lines 3 connected to the shared thin film transistors 6 located in the lens areas 1 are configured as first common signal lines 31 for receiving first common voltage signals; the common signal lines 3 connected to the shared thin film transistors 6 in the lens splicing areas 2 are configured as a second common signal lines 32 for receiving second common voltage signals.

It should be noted that the sources 62 and the drains 61 of the shared thin film transistors 6 can be used interchangeably, and are not limited to the connection method in the present embodiment. The shared thin film transistors 6 can be, but not limited to, N-channel thin film transistors, and also can be P-channel thin film transistors. It can be expected that in the design process of the display panel, according to the size and number of lens used by the exposure machine, the lens areas 1 and the lens splicing areas 2 can be pre-calibrated through conversion, so as to distinguish the first common signal lines 31 and the first common signal lines 32 and to receive the first common voltage signals and the second common voltage signals respectively. On this basis, the shared thin film transistors 6 of the lens areas 1 and the lens splicing areas 2 can be adjusted separately, and the difference in partial voltages of the shared thin film transistors 6 in the lens splicing areas 2 can be eliminated and the Lens-Mura occurring in the lens splicing areas 2 can be relieved.

As shown in FIG. 4, in one of the embodiments, the main pixel areas are provided with main thin film transistors 4, and the sub-pixel areas are provided with sub-thin film transistors 5. Data lines 7 corresponding to the pixel unit are connected to drains 41 of the main thin film transistors 4 and drains 51 of the sub-thin film transistors 5, and the scan lines 8 are connected to gates 43 of the main thin film transistors 4, gates 53 of the sub-thin film transistors 5, and gates 63 of the shared thin film transistors 6. Sources 42 of the main thin film transistors 4 are connected to main pixel electrodes arranged in the main pixel area, and sources 52 of the sub-thin film transistors 5 are connected to the sub-pixel electrodes and the sources 62 of the shared thin film transistors 6.

It should be noted that when the main thin film transistors 4 and the sub-thin film transistors 5 are N-channel thin film transistors, the sources and drains can be used interchangeably, and are not limited to the connection method in the embodiment.

In one of the embodiments, the first common signal lines 31 and the second common signal lines 32 are both transparent metal wires, and are located in different film layers.

It should be noted that the first common signal lines 31 and the first common signal lines 32 may be, but not limited to, located in different layers, and can be located in different layers of the same film layer or in the same layer of the same film layer. The first common signal lines 31 and the first common signal lines 32 are not crosswise with each other to avoid crosstalk.

In one of the embodiments, voltages of the first common voltage signals are different from voltages of the second common voltage signals.

It should be noted that, the second common voltage signals are used to adjust difference in the partial voltages of the shared thin film transistors 6 in the lens splicing areas 2, and the second common voltage signals can be adjusted according to the channel length difference of the shared thin film transistors 6 in the lens splicing areas 2 until the Lens-Mura occurring in the lens splicing areas 2 is effectively eliminated.

In one of the embodiments, each second common signal line 32 is connected to the drains 61 of the shared thin film transistors 6 in a corresponding column, and the shared thin film transistors 6 in the corresponding column are located in the lens splicing areas 2.

In one of the embodiments, each first common signal line 31 is connected to the drains 61 of the shared thin film transistors 6 in a corresponding column, and the shared thin film transistors 6 in the corresponding column are located in the lens areas 1.

In one of the embodiments, the present disclosure provides an array substrate, which includes a plurality of pixel units disclosed in any one of the above embodiments, and the plurality of pixel units are distributed in array arrangement on the array substrate.

In one of the embodiments, the present disclosure provides a display panel, which includes the pixel unit and the color filter substrate disclosed in the first embodiment of the first aspect, and a liquid crystal layer between the pixel unit and the color filter substrate.

In one of the embodiments, a transparent electrode layer is formed on the color filter substrate; main storage capacitors are formed between the main pixel electrodes and the transparent electrode layer; and sub-storage capacitors are formed between the sub-pixel electrodes and the transparent electrode layer.

In one of the embodiments, the main storage capacitors and the sub-storage capacitors have the same capacitance.

It should be noted that the present embodiment is beneficial to the uniform display of the main pixel areas and the sub-pixel areas.

It can be understood that, for those of ordinary skill in the art, equivalent replacements or changes can be made according to the technical solutions and inventive concepts of the present disclosure, and all such changes or replacements should fall within the protection scope of the claims appended to the present disclosure.

What is claimed is:

1. A pixel unit, wherein the pixel unit comprises main pixel areas and sub-pixel areas, and the sub-pixel areas are provided with shared thin film transistors to pull down voltages of sub-pixel electrodes;
gates of the shared thin film transistors are connected to scan lines corresponding to the pixel unit, sources of the shared thin film transistors are connected to the sub-pixel electrodes, and drains of the shared thin film transistors are connected to common signal lines; and
the shared thin film transistors have lens areas and lens splicing areas alternately formed corresponding to an exposure equipment during a manufacturing process, wherein the common signal lines connected to the shared thin film transistors located in the lens areas are configured as first common signal lines for receiving first common voltage signals, and the common signal lines connected to the shared thin film transistors located in the lens splicing areas are configured as second common signal lines for receiving second common voltage signals.

2. The pixel unit according to claim 1, wherein the main pixel areas are provided with main thin film transistors, and the sub-pixel areas are provided with sub-thin film transistors;
data lines corresponding to the pixel unit are connected to drains of the main thin film transistors and drains of the sub-thin film transistors;
the scan lines are connected to gates of the main thin film transistors, gates of the sub-thin film transistors, and the gates of the shared thin film transistors;
sources of the main thin film transistors are connected to main pixel electrodes arranged in the main pixel areas; and
sources of the sub-thin film transistors are connected to the sub-pixel electrodes and the sources of the shared thin film transistors.

3. A display panel, wherein the display panel comprises the pixel unit of claim 2 and a color filter substrate, and a liquid crystal layer between the pixel unit and the color filter substrate.

4. The display panel according to claim 3, wherein a transparent electrode layer is formed on the color filter substrate, main storage capacitors are formed between the main pixel electrodes and the transparent electrode layer, and sub-storage capacitors are formed between the sub-pixel electrodes and the transparent electrode layer.

5. The display panel according to claim 4, wherein the main storage capacitors and the sub-storage capacitors have a same capacitance.

6. The display panel according to claim 3, wherein the first common signal lines and the second common signal lines are both transparent metal wires and are located in different film layers.

7. The display panel according to claim 3, wherein voltages of the first common voltage signals are different from voltages of the second common voltage signals.

8. The display panel according to claim 3, wherein each of the second common signal lines is connected to the drains of the shared thin film transistors in a corresponding column, and the shared thin film transistors in the corresponding column are located in the lens splicing areas.

9. The display panel according to claim 3, wherein each of the first common signal lines is connected to the drains of the shared thin film transistors in a corresponding column, and the shared thin film transistors in the corresponding column are located in the lens areas.

10. The pixel unit according to claim 1, wherein the first common signal lines and the second common signal lines are both transparent metal wires and located in different film layers.

11. The pixel unit according to claim 1, wherein voltages of the first common voltage signals are different from voltages of the second common voltage signals.

12. The pixel unit according to claim 1, wherein each of the second common signal lines is connected to the drains of the shared thin film transistors in a corresponding column, and the shared thin film transistors in the corresponding column are located in the lens splicing areas.

13. The pixel unit according to claim 1, wherein each of the first common signal lines is connected to the drains of the shared thin film transistors in a corresponding column, and the shared thin film transistors in the corresponding column are located in the lens areas.

14. An array substrate, wherein the array substrate comprises a plurality of pixel units according to claim 1, and the plurality of pixel units are distributed in array arrangement on the array substrate.

15. The array substrate according to claim 14, wherein the main pixel areas are provided with main thin film transistors, and the sub-pixel areas are provided with sub-thin film transistors;
    data lines corresponding to the pixel units are connected to drains of the main thin film transistors and drains of the sub-thin film transistors;
    the scan lines are connected to gates of the main thin film transistors, gates of the sub-thin film transistors, and the gates of the shared thin film transistors;
    sources of the main thin film transistors are connected to main pixel electrodes arranged in the main pixel areas; and
    sources of the sub-thin film transistors are connected to the sub-pixel electrodes and the sources of the shared thin film transistors.

16. The array substrate according to claim 14, wherein the first common signal lines and the second common signal lines are both transparent metal wires and are located in different film layers.

17. The array substrate according to claim 14, wherein voltages of the first common voltage signals are different from voltages of the second common voltage signals.

18. The array substrate according to claim 14, wherein each of the second common signal lines is connected to the drains of the shared thin film transistors in a corresponding column, and the shared thin film transistors in the corresponding column are located in the lens splicing areas.

19. The array substrate according to claim 14, wherein each of the first common signal lines is connected to the drains of the shared thin film transistors in a corresponding column, and the shared thin film transistors in the corresponding column are located in the lens areas.

* * * * *